United States Patent
Wigren et al.

(10) Patent No.: US 9,332,507 B2
(45) Date of Patent: May 3, 2016

(54) THERMAL NOISE FLOOR ESTIMATION ROBUSTNESS VIA MULTI-CARRIER COMBINING

(75) Inventors: Torbjörn Wigren, Uppsala (SE); Johan Klerborg, Lidingö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/412,841

(22) PCT Filed: Jul. 16, 2012

(86) PCT No.: PCT/SE2012/050838
§ 371 (c)(1),
(2), (4) Date: Jan. 5, 2015

(87) PCT Pub. No.: WO2014/014393
PCT Pub. Date: Jan. 23, 2014

(65) Prior Publication Data
US 2015/0195792 A1 Jul. 9, 2015

(51) Int. Cl.
*H04W 52/24* (2009.01)
*H04W 52/14* (2009.01)
(Continued)

(52) U.S. Cl.
CPC ........... *H04W 52/243* (2013.01); *H04B 17/345* (2015.01); *H04W 52/146* (2013.01); *H04W 52/16* (2013.01)

(58) Field of Classification Search
CPC ..................................................... H04B 17/345
See application file for complete search history.

(56) References Cited

U.S. PATENT DOCUMENTS

| 8,565,094 B2 * | 10/2013 | Ringstrom | ............ H04L 41/147 370/235 |
| 8,599,911 B2 * | 12/2013 | Park | ...................... H04B 17/336 375/227 |
| 9,020,548 B2 * | 4/2015 | Wigren | ............. H04W 72/1252 455/452.2 |

(Continued)

FOREIGN PATENT DOCUMENTS

WO  WO 2008/039123  4/2008
WO  WO 2011/031193  3/2011
(Continued)

OTHER PUBLICATIONS

Office action in EP application No. 12881466.2 mailed Jun. 25, 2015, 3 Pages.
(Continued)

*Primary Examiner* — Bobbak Safaipour
(74) *Attorney, Agent, or Firm* — Patent Portfolio Builders, PLLC

(57) ABSTRACT

The present invention provides methods and arrangements 300 which are configured to determine a noise rise estimates in a radio access node of a Radio Network System 100 supporting Multi-Carrier High-Speed Packet Access transmission of user radio traffic between a radio access node and one or more User Equipments. The arrangement is provided with a combiner combining the estimated thermal noise power floors of all carriers of a set of carriers sharing the same antenna branch, into a single thermal noise power floor estimate, valid for all carriers in said set of carriers sharing the same analogue signal path. A noise rise determiner computes noise rise estimates as a quotient of the momentary received total wideband power of a carrier related to an analogue signal path, and said combined thermal noise power floor for said analogue signal path.

16 Claims, 7 Drawing Sheets

(51) Int. Cl.
*H04W 52/16* (2009.01)
*H04B 17/345* (2015.01)

(56) References Cited

U.S. PATENT DOCUMENTS

| | | | |
|---|---|---|---|
| 2008/0227400 A1* | 9/2008 | Wigren | H04B 1/7097 455/67.13 |
| 2010/0035558 A1 | 2/2010 | Wigren | |
| 2011/0151802 A1 | 6/2011 | Kwak et al. | |
| 2012/0140656 A1 | 6/2012 | Wigren et al. | |
| 2014/0056164 A1* | 2/2014 | Wigren | H04W 24/00 370/252 |
| 2014/0112164 A1* | 4/2014 | Wigren | H04W 24/08 370/252 |

FOREIGN PATENT DOCUMENTS

| | | | |
|---|---|---|---|
| WO | 2011136706 A1 | 11/2011 | |
| WO | 2012044215 A1 | 4/2012 | |

OTHER PUBLICATIONS

3GPP TS 25.214 V11.2.0; 3rd Generation Partnership Project; Technical Specification Group Radio Access Network; Physical layer procedures (FDD) (Release 11), Jun. 2012.

3GPP TS 25.331 V11.2.0; 3rd Generation Partnership Project; Technical Specification Group Radio Access Network; Radio Resource Control (RRC); Protocol specification (Release 11) Due to size, this reference has been split into 10 separate parts, Jun. 2012.

3GPP TS 25.304 V10.5.0; 3rd Generation Partnership Project; Technical Specification Group Radio Access Network; User Equipment (UE) procedures in idle mode and procedures for cell reselection in connected mode (Release 10), Jun. 2012.

PCT Written Opinion of the International Searching Authority for International application No. PCT/SE2012/050838, Jul. 11, 2013.

International Search Report for International application No. PCT/SE2012/050838, Jul. 15, 2013.

"Soft Uplink Load Estimation in WCDMA" by Torbjörn Wigren; IEEE Transactions on Vehicular Technology, vol. 58, No. 2, Feb. 2009.

* cited by examiner

THERMAL NOISE FLOOR ESTIMATION ROBUSTNESS VIA MULTI-CARRIER COMBINING

PRIORITY

This nonprovisional application is a U.S. National Stage Filing under 35 U.S.C. §371 of International Patent Application Ser. No. PCT/SE2012/050838, filed Jul. 16, 2012, and entitled "THERMAL NOISE FLOOR ESTIMATION ROBUSTNESS VIA MULTI-CARRIER COMBINING."

TECHNICAL FIELD

The present invention relates in general to methods and devices for estimation of power-related quantities in cellular communications systems and in particular for estimation of thermal noise floor and Rise over Thermal.

BACKGROUND

Wideband Code Division Multiple Access, WCDMA, telecommunication systems have many attractive properties that is used for telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell. The admission control function of the RNC in WCDMA is thus central, since overload results in poor quality of service and unstable cells, behaviours needed to be avoided.

The admission control algorithms need to balance the available resources of each cell or RBS, against the requested traffic by users. This means that important inputs to the admission control algorithms include available HW resources, as well as information on the momentary number of users and their on-going traffic, in each cell.

In order to retain stability of a cell, and to increase the capacity, fast enhanced uplink scheduling algorithms operate to maintain the load below a certain level. This follows since the majority of uplink user channels, at least in WCDMA, are subject to power control. This power control aims at keeping the received power level of each channel at a certain signal to interference ratio, SIR, in order to be able to meet specific service requirements. This SIR level is normally such that the received powers in the radio base station, RBS, are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink, E-UL, channel in WCDMA, so that one can insure that instability is avoided. In order to do so, the momentary load must be estimated in the RBS. This enables the assessment of the capacity margin that is left to the instability point.

A particularly useful measure is the uplink (and downlink) cell load(s), measured in terms of the rise over thermal (or noise rise). Rise over thermal (ROT) is defined as the quotient between the momentary wide band power and a thermal noise floor level. All noise rise measures have in common that they rely on accurate estimates of the background noise. Determinations of highly fluctuating power quantities or noise floor according to prior art is typically associated with relatively large uncertainties, which even may be in the same order of magnitude as the entire available capacity margin. It will thus be very difficult indeed to implement enhanced uplink channel functionality without improving the load estimation connected thereto.

At this point it could be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the path-loss to the digital receiver. Since the path-loss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the path-loss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS.

Furthermore, the admission control and congestion control functionality in the radio network controller, RNC, that controls a number of RBSs also benefits from accurate information on the momentary noise rise of each cell it controls. The bandwidth by which the RNC functionality affect the cell performance is significantly slower than what was described above, for enhanced uplink scheduling, however, the impacts on cell stability that was discussed above for enhanced uplink are also valid to some extent for the admission control functionality of the RNC.

Admission control assures that the number of users in a cell do not become larger than what can be handled, in terms of hardware resources and in terms of load. A too high load first manifests itself in too poor quality of service, a fact that is handled by the outer power control loop by an increase of the SIR target. In principle this feedback loop may also introduce power rushes, as described above.

The admission control function can prevent both the above effects by regulation of the number of users and corresponding types of traffic that is allowed for each cell controlled by the RNC. A particularly important input to achieve this goal is an accurate estimate of the noise rise of the cell. Hence there is a need for estimation of noise rise in the RNC.

Solutions for the problem to estimate the noise rise are presented in the international patent applications WO 2007/024166, WO 2008/039123 A1 and WO 2011/031193 A1.

Currently, WCDMA networks are experiencing a very fast increase of the uplink traffic levels. The explanation is the introduction of smart phones. These devises both introduce new services that produce upload of large chunks of information, e.g. video clips. They also introduce new low rate signalling. Together, the result is An increased uplink interference level;
Traffic around the clock (24/7).

This causes problems for the enhanced uplink, EUL. The reason is that EUL operates by scheduling of users with the target of filling the available interference headroom. This headroom is measured in terms of the rise over thermal, RoT, i.e. the quotient between the total uplink wideband power and the thermal noise floor. The fundamental problem is that when traffic levels remain high 24/7, i.e. 24 hours night and day, the whole week, so does the total received wideband power. The consequence is that it becomes difficult to observe a minimum value that is close to the correct thermal noise floor. Or in other words, that the on-going increase of uplink traffic tend to generate interference 24/7, meaning that there will be no time of day where the traffic is so low that an accurate estimate of the thermal noise power floor can be obtained, by observation of the total wideband received power, as obtained by power estimation of the IQ chip stream from the Radio Unit/Remote Radio Unit RU/RRU. This leads to a too low estimate of the uplink load level, i.e. the RoT. In turn, this leads to scheduling of even more traffic. Eventually this positive feedback may lead to a breakdown of the EUL scheduling and load estimation concept.

SUMMARY

One object of this disclosure is to provide an estimation of power-related quantities in cellular communications systems and in particular for estimation of thermal noise floor and Rise over Thermal for avoiding instability and breakdown in a Radio Network System supporting Multi-Carrier High-Speed Packet Access transmission.

One aspect of the present invention is a method for determining a noise rise estimate. Embodiments of said method are also provided in this disclosure. The method for determining a noise rise estimate is performed in a radio access node of a Radio Network System supporting Multi-Carrier High-Speed Packet Access transmission of user radio traffic between a radio access node and one or more User Equipments. At least one radio access node comprises a radio front end comprising a Radio Unit, RU, and/or Remote Radio Unit, RRU, which comprises one or more antenna branches constituting one or more analogue signal paths for received carriers. The method comprises estimating the thermal noise power floor for each carrier and antenna branch, separately, and determining by means of RU/RRU configuration data for a set of carriers that share an analogue signal path from the antenna to a signal point where the thermal noise power floor estimation is performed. The method further comprises combining the estimated thermal noise power floors of all carriers of a set of carriers sharing the same analogue signal path, into a combined thermal noise power floor estimate, valid for all carriers in said set of carriers sharing the same analogue signal path. Finally, a noise rise estimate is computed as a quotient of the momentary received total wideband power of a carrier related to an analogue signal path, and said combined thermal noise power floor for said analogue signal path.

Another aspect of the invention is an arrangement for determining a noise rise estimate. Embodiments of said arrangement are also disclosed. The arrangement is configured to determine a noise rise estimate in a radio access node of a Radio Network System supporting Multi-Carrier High-Speed Packet Access transmission of user radio traffic between the radio access node and one or more User Equipments. At least one radio access node comprises a radio front end comprising a Radio Unit, RU, and/or Remote Radio Unit, RRU, which comprises one or more antenna branches constituting one or more analogue signal paths for received carriers. The arrangement comprises estimator means configured to estimate the thermal noise power floor for each carrier and antenna branch, separately, and determiner means configured to determine by means of RU/RRU configuration data which sets of carriers sharing an analogue signal path from the antenna to a signal point where the thermal noise power floor estimation is performed. The arrangement is provided with a combiner configured to combine the estimated thermal noise power floors of all carriers of a set of carriers sharing the same analogue signal path, into a combined thermal noise power floor estimate, valid for all carriers in said set of carriers sharing the same analogue signal path. A noise rise determiner is configured to compute noise rise estimate as a quotient of the momentary received total wideband power of a carrier related to an analogue signal path, and said combined thermal noise power floor for said analogue signal path. One advantage by performing individual thermal noise power floor estimation, followed by combining such estimates with a common analogue signal path, is that the accuracy of the thermal noise power floor is enhanced.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

The present invention relates to the field of load estimation in code division multiple access cellular telephone systems. Several radio resource management, RRM, algorithms, such as scheduling and admission control, rely on accurate estimates of the uplink load.

In the description above, it is assumed that the power estimations concern uplink communication. The power measurements and noise rise estimations are in such cases performed by a node in the radio access network, typically the Radio Base Station RBS or the Radio Network Controller RNC.

Figure 1:
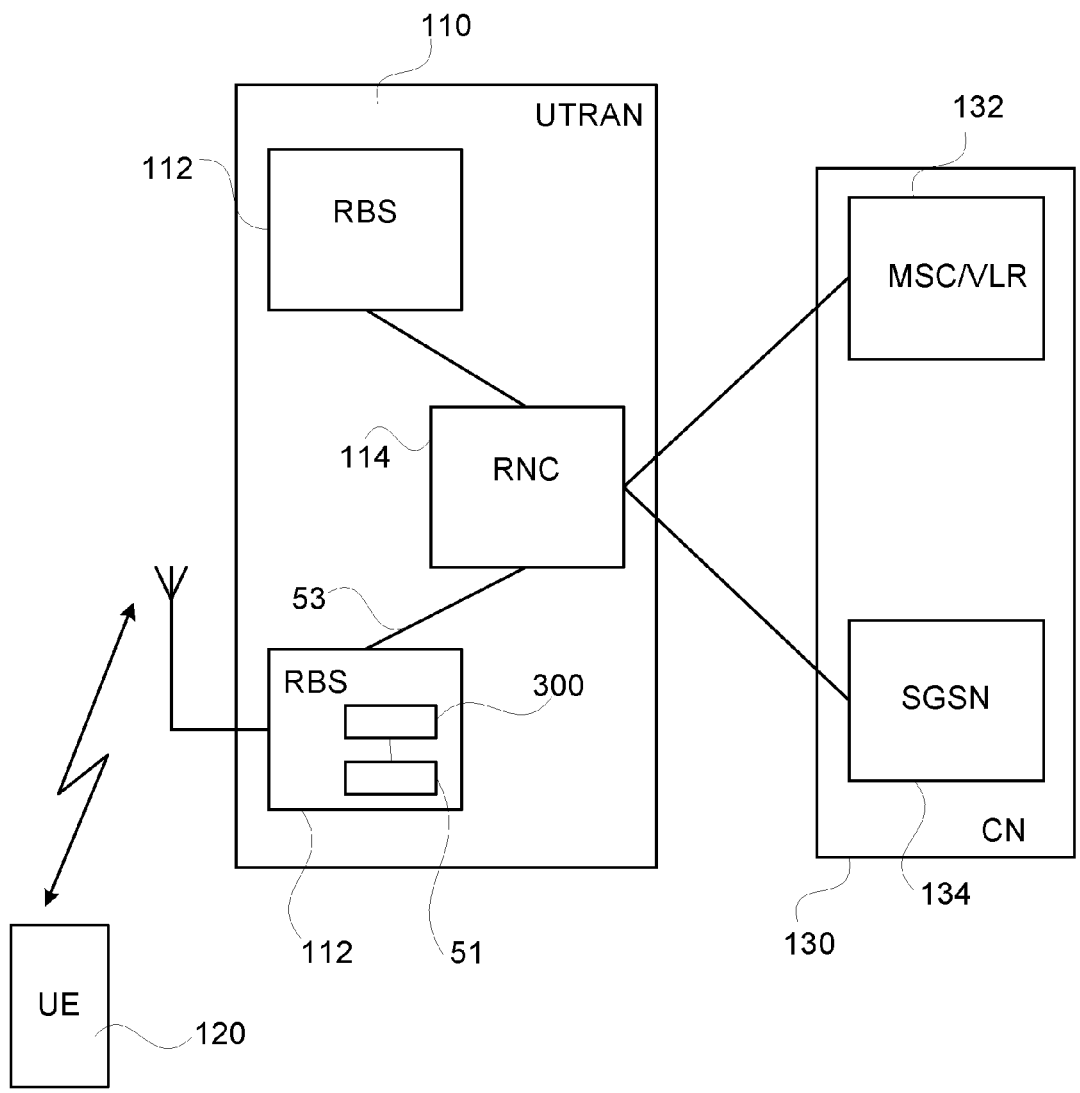
FIG. 1 is a block diagram of an exemplary network in which systems and methods described herein may be implemented.

FIG. 1 illustrates main parts of an embodiment of a system according to the present invention, where load estimation is performed in the RBS. A wireless communications system 100 comprises a Universal mobile telecommunication system Terrestrial Radio Access Network, UTRAN, 110. In this example, the UTRAN comprises two RBSs. A mobile terminal 120 is in radio contact with one RBS 112 in the UTRAN 110. The RBS 112 is controlled by a Radio Network Controller RNC 114, which in turn is connected to a Mobile services Switching Centre/Visitor Location Register, MSC/VLR 132 and a Serving General packet radio system Support Node, SGSN, 134 of a core network CN 130.

In this embodiment, the RBS 112 comprises a power sensing arrangement 51, typically an antenna and front end electronics, for measuring instantaneous received total wideband power. A noise rise estimation arrangement 300 according to the invention is available in the RBS 112. A connection 53, the so-called Iub interface, is used for communication between the RBS 112 and the RNC 114. According to standards, the Iub interface allows for transferring measured samples of received total wideband power. In some embodiments, the RNC 114 may be arranged for receiving measured samples of received total wideband power over the connection 53. The noise rise estimation arrangement 300 according to the invention is described in more detail herein, see especially FIGS. 6 and 7.

Figure 2:
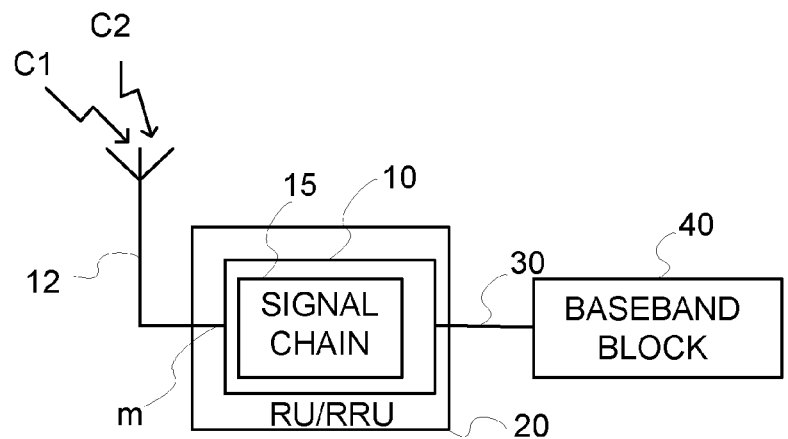
FIG. 2 is a block diagram illustrating a signal chain of a RBS.

An example of a schematic RBS configuration is depicted in FIG. 2. An antenna 12 receives wideband signals, typically carriers C1, C2 in a WCDMA system, Said antenna 12 is connected to a radio front end comprising a Radio Unit or Remote Radio Unit RU/RRU 20 comprising an antenna branch 10 with an analogue signal conditioning chain 15, Said signals first pass the antenna branch 10 with the analogue signal conditioning chain 15 before reaching a base band block 40 of the RBS. Said antenna branch 10 constitutes an analogue signal path m for the wide band signals. The analogue signal conditioning chain may typically consists of cables, filters etc. Variations among components together with temperature drift, render the scale factor of this part of the system to be undetermined with about 2-3 dBs. In the Radio Unit or Remote Radio Unit RU/RRU 20 a number of operations take place. For load estimation it is normally assumed that a total received wideband power is measured at some stage after the analogue to digital conversion of the analogue signal into a chip stream. Furthermore, it is assumed in this embodiment that code power measurements, i.e. powers of each individual channel/user of the cell, are made available at a stage. A reference point for estimated quantities is schematically shown in FIG. 2 and it is referred to as 30. Said reference point in the chain is where measurements are taken and where estimated quantities are valid.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain 20 does introduce a scale factor error of 2-3 dB between RBSs (batch) that is difficult to compensate for. The Received Total Wideband Power, RTWP, measurement that is divided by the default value of the thermal noise power floor may therefore be inconsistent with the assumed thermal noise power floor by 2-3 dB. The effect would be a noise rise estimate that is also wrong by 1-2 dB. Considering the fact that the allowed noise rise interval in a WCDMA system is typically 0-10 dB, an error of 2-3 dB is not acceptable.

Figure 3:
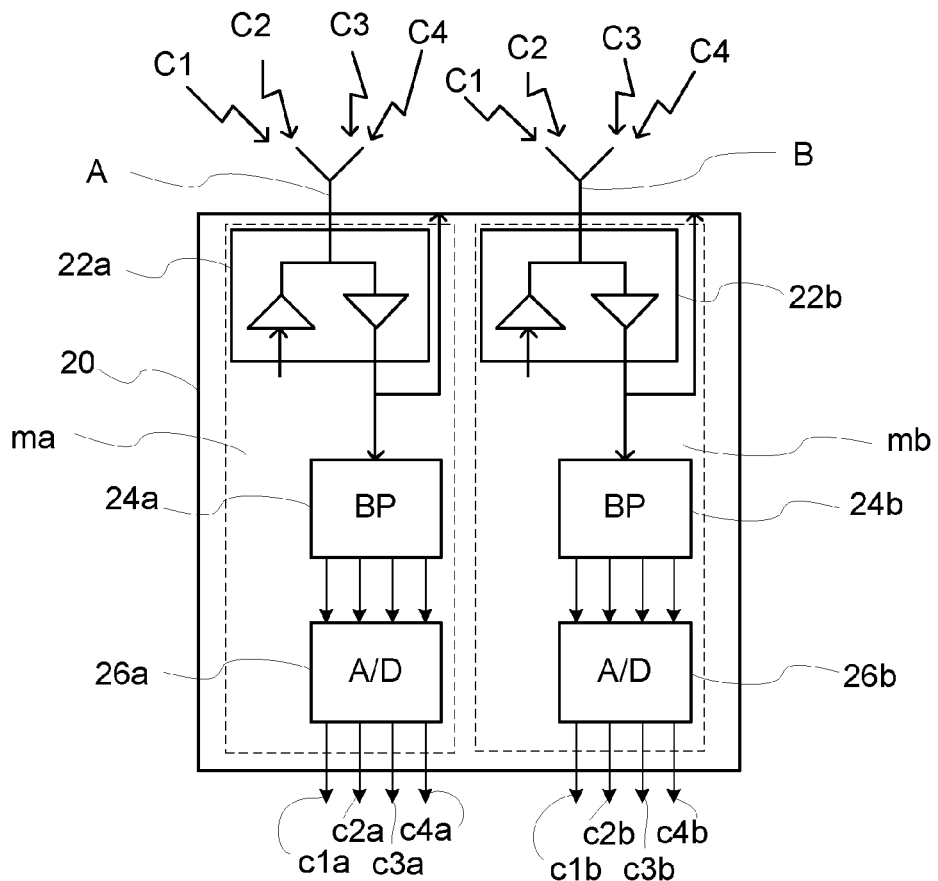
FIG. 3 is block diagram illustrating a radio front end of a RBS serving multi-carrier radio traffic.

FIG. 3 is block diagram illustrating an embodiment of a radio front end 20 of a RBS serving multi-carrier radio traffic.

In more detail, FIG. 3 illustrates a radio front end which is a Radio Unit or Remote Radio Unit RU/RRU 20 with two antennas and antenna branches, A and B. Branch A constitutes a signal path ma and Branch B constitutes a signal path mb. The antenna branches comprise duplexers 22a, 22b that provide isolation between a downlink multicarrier power amplifier, MCPA, and an uplink low noise amplifier, LNA. The bandwidth of the devices support multiple carriers separated in frequency, where each carrier typically covers a 5 MHz frequency band. The total radio receiver bandwidth may be 20 MHz, allowing for 4 uplink carriers C1, C2, C3 and C4. Among other things, the RU/RRU provides band pass filters 24a, 24b filtering to separate the carriers C1, C2, C3 and C4, and Analogue-to-Digital converters 26a, 26b to provide A/D converted analogue wideband signals into chip streams that are related to each carrier and each antenna branch. Consequently the configuration of FIG. 3 generates 8 chip streams, first four in antenna branch A: c1a, c2a, c3a and c4a, and the second four in antenna branch B: c1b, c2b, c3b and c4b. It can be noted that carriers C1, C2, C3 and C4 use same antenna branch A or B and same RU/RRU for band pass filtering and A/D conversion. The carriers and their corresponding analogue wideband signals are therefore considered to share the same analogue signal path. Hence, the analogue wideband signals may be regarded to constitute a set of carriers on said analogue signal path. If carriers are denoted k and a signal path m, one such set is denoted $$\{k,a|\text{signalpath}=m\}=\{\{k_1,a\},\ldots,\{k_{max},a\}\}=\{k_1,\ldots,k_{max},m\},$$

where a corresponds to a specific antenna head upon which uplink power is impinging.

Figure 4:
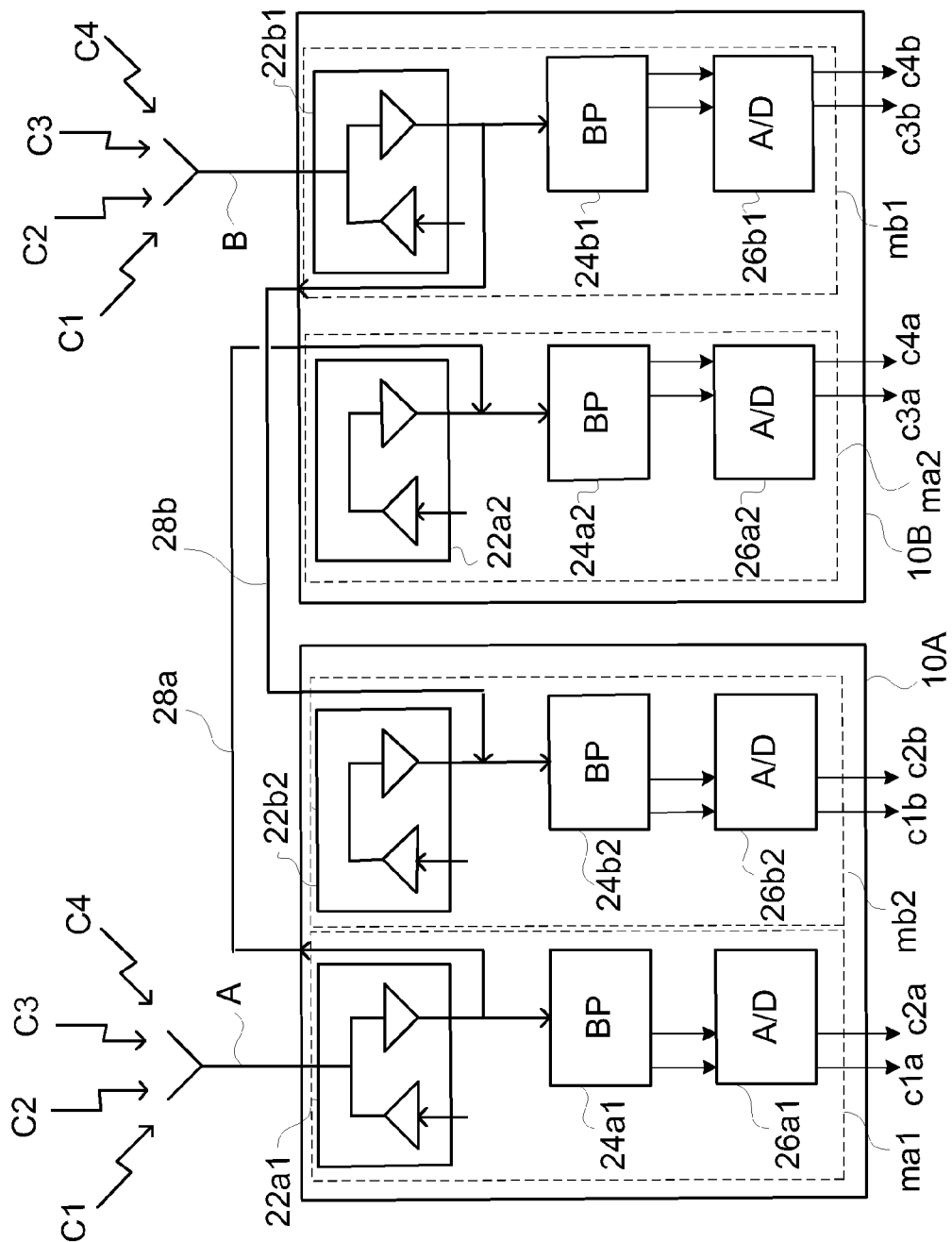
FIG. 4 is a block diagram illustrating another radio front end configuration of a RBS serving multi-carrier radio traffic.

FIG. 4 illustrates another radio front end configuration wherein the analogue signal paths are not shared by the carriers. These particular cases are denoted "cross connect".

2 RU's in the same sector are used when the RU/RRU only has one multi carrier power amplifier, MCPA, and transmit diversity (TXD) or MIMO is used in the downlink or when more power is needed for 2 carriers in the downlink. Analogue cross connect is also used when carrier separation is more than 20 Mhz.

In more detail, FIG. 4 illustrates two radio front ends 10A and 10B with two antenna branches each, ma1 and mb2 in front end 10A and mb1 and ma2 in front end 10B. Each radio front end is a Radio Unit or Remote Radio Unit RU/RRU. Branch ma1 comprises signal conditioning chain 22a1, a bandpass filter 24a1 and a A/D converter 26a1. Branch ma2 comprises signal conditioning chain 22a2, a bandpass filter 24a2 and a A/D converter 26a2. Branch mb1 comprises signal conditioning chain 22b1, a bandpass filter 24b1 and a A/D converter 26b1. Branch mb2 comprises signal conditioning chain 22b2, a bandpass filter 24b2 and a A/D converter 26b2.

Radio front ends 10A and 10B are cross connected via connections 28a and 28b. Antenna branch ma1 of radio front end 10A is connected via connection 28a to antenna branch ma2 of radio front end 10B, and antenna branch mb1 of radio front end 10B is connected via connection 28b to antenna branch mb2 of radio front end 10A.

Among other things the RU/RRU provides band pass filtering to separate the carriers C1, C2, C3 and C4, and to provide A/D converted chip streams that are related to each carrier and each antenna branch. Consequently the radio configuration in FIG. 4 also generates 8 chip streams. The first two c1a, c2a are generated in antenna branch ma1 and the next two c3a and c4a in antenna branch mb2. Consequently, said chip streams do not share the same analogue signal path. In the same way, the chip streams c1b, c2b are generated in antenna branch ma2 and the next two c3b and c4b in antenna branch mb1. Similarly, said chip streams do not share the same analogue signal path.

If the carriers are using the same antenna branch and same RU/RRU for band pass filtering and A/D conversion the analogue paths are the same, if it's not the same RU for band pass filtering and A/D conversion the analogue paths are not the same. In an analogue cross connect configuration with more than 2 carriers there can be carriers with the same analogue path that can be used for combined estimations.

Many other configurations exist, in particular when 4 antenna branches are used.

One reason for the difficulty with noise rise estimation is that the thermal noise floor is not always the sought quantity. There are situations where constant in-band interference significantly affects the receiver of the RBS. These constant interferers do not affect the stability of the system, they rather appear as an increased noise temperature, i.e. an increased thermal noise floor.

Figure 5A:
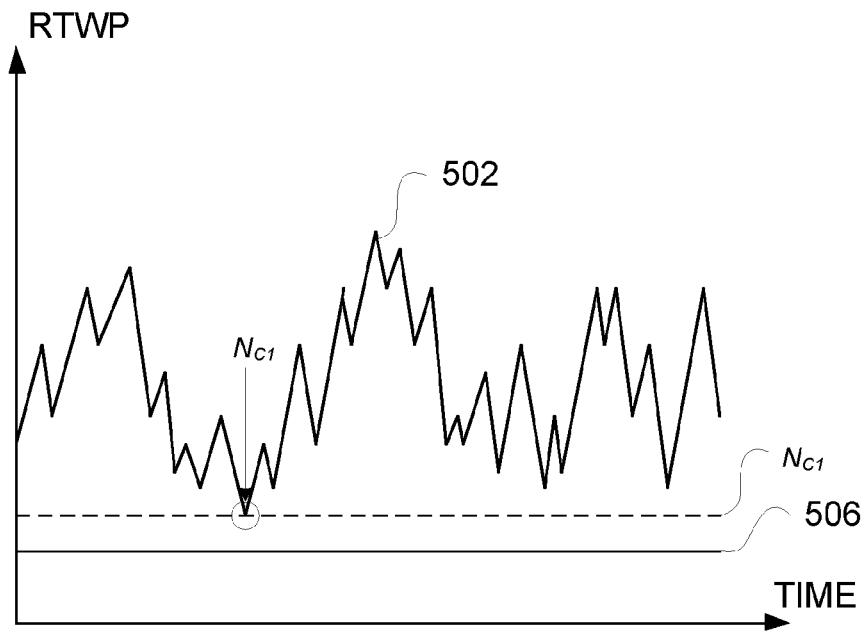
FIG. 5*a* is a diagram showing a hypothetical measured RTWP fluctuation of a received carrier k over time at a signal path m.

FIG. 5a is a diagram showing a hypothetical measured RTWP fluctuation of a received carrier k over time at a signal path m. Momentary values 502 of a received total wideband power are here illustrated as a function of time for one carrier k of ktot carriers and one signal path m of mtot signal paths, k=1,2,3, . . . , ktot; m=1,2,3, . . . , mtot. In this example, said carrier k is denoted C1 and the signal path m is denoted ma. The values fluctuate considerably depending on the momentary load. It is known that the thermal noise floor contribution always is present, and consequently it can be concluded that if measurement uncertainties are neglected, the noise floor contribution has to be equal to or smaller than the minimum value $N_{C1}$ of the total received wideband power received within a certain period of time. If there is a reasonable probability that all code power contributions, neighbour cell contributions and other external contributions at some occasion are equal to zero, the minimum value $N_{C1}$ is a good estimation of the "true" noise floor 506. However, in all situations, it is certain that the minimum value $N_{C1}$ constitutes an upper limit of the unknown noise floor.

In order to improve the estimation of the noise floor, a recursive estimation filter may be applied to the series of measurements, providing estimates of the received total wideband power, as well as the variance thereof. The thermal noise power floor may then be estimated by soft algorithms.

Figure 5B:
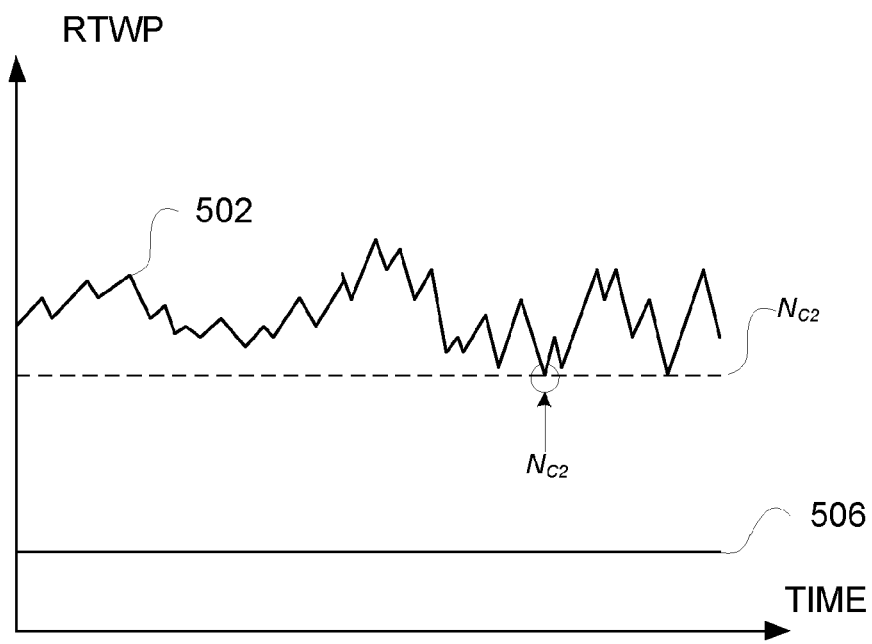
FIG. 5*b* is a diagram showing a hypothetical measured RTWP fluctuation of another received carrier k over time at the same signal path m as in FIG. 5*a*.

FIG. 5b is a diagram showing an hypothetical measured RTWP fluctuation over time for another carrier k, denoted C2 and the same signal path m1 as C1 in FIG. 7a. As illustrated, the fluctuation of the momentary load is less for carrier C2 than C1. Carrier C2 carries more radio traffic load resulting in a higher average value $RTWP_{av}$ than corresponding value for C1. When determining the minimum value $N_{C2}$ for said carrier C2, said value is higher than the minimum value for C1. As the noise rise over thermal, RoT, is established per carrier by $$RoT(t) = \frac{RTWP(t)}{N},$$

where N is the thermal noise level as measured at the antenna connector.

The definition of RTWP(t) is the total wideband power $$RTWP(t) = \sum_{k=1}^{K} P_k(t) + I(t) + N,$$

In prior art, the RoT(t) value for carrier C1 is established by dividing the RTWP(t) value for carrier C1 with the minimum value $N_{C1}$ while the RoT(t) value for carrier C2 is established by dividing the RTWP(t) value for carrier C1 with the minimum value $N_{C2}$. The principle of using a division with an established thermal noise floor power has a number of properties, some of which may be disadvantages, at least in certain applications. The estimation principle establishes a specific value of the thermal noise power floor, as the output variable. The output quantity that is really needed is the noise rise. Furthermore, the estimation principle does not provide any measure of the accuracy of the estimated thermal noise power floor, nor the noise rise. This is a consequence of the fact that the thermal noise power floor is estimated per carrier only.

Moreover, the estimation principle above does not account the true thermal noise floor power for a signal path and/or antenna branch. This has further consequences. The estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor. Hence, when the minimum is estimated over a determined interval of time, a value larger than the true thermal noise power is always obtained. Further, if an established thermal noise floor power estimate N for a carrier differs too much from the "true" noise floor power estimate N, i.e. is too high, the RoT(t) for said carrier will be too small. A consequence of this is that the noise rise is underestimated, i.e. the load of the carrier in a cell is underestimated. The consequence could be too aggressive scheduling, i.e. more and more traffic will be scheduled on said carrier, leading e.g. to cell instability.

The embodiments of the method and arrangement according to the present invention solve the problem with underestimated noise rise estimates by establishing a combined thermal noise floor power signal path and/or antenna branch $Nmin_m$ for a set of carriers using said signal path and/or antenna branch.

Said combined thermal noise floor power per signal path $Nmin_m$ may be established by the following equation $$Nmin_m = \hat{P}_{m,N_0}(t)$$
$$= \min_{k_1,\ldots,k_{max}} (P_{k_1,m,N_0}(t), \ldots, P_{k_{max},m,N_0}(t))$$
$$= \min\{N_{C1}, N_{C2}\} \text{ for path } m \text{ and carrier } k \; (=C1) = N_{C1}.$$

In accordance with the invention, the noise rise over thermal estimate, RoT, for carrier C2 may be established per carrier and signal path by using e.g.

$$RoT(t) = \frac{RTWP(t)}{N},$$

where $N = Nmin_m = N_{C1}$. As $N_{C1} < N_{C2}$, and $N_{C1}$ is closer to the true thermal noise level $N_{true}$ (506 in FIG. 5) for said signal path and antenna branch, the established RoT(t) estimate for Carrier C1 is a better estimation of the "true" RoT(t) for carrier C1 than the established RoT(t) estimate for Carrier C2 is for the RoT(t) for carrier C2.

Thus, the invention aims at enhancing the robustness of the present noise power floor estimation, by disclosing of new combining means utilizing multi-carrier scheduling. The idea is based on the fact that irrespective of any analogue combining, the total uplink interference of each (frequency shifted) carrier that enters a specific antenna branch of a diversity antenna arrangement, follows the same analogue signal path in to the digital baseband receiver. There digital bandpass filtering cuts out the specific carrier from the radio receiver frequency band (typical BW 20 MHz). Furthermore, the thermal noise power floor is dependent on and characterized only by the front end electronics and cabling in the analogue signal path related to each antenna branch. Therefore, as explained below, the invention discloses the use of one thermal noise estimator per carrier on each antenna branch, i.e. analogue signal path. Since the result of the thermal noise power floor should be the same for all carriers on the same antenna branch/analogue signal path, the invention also teaches the use of the minimum of the estimated thermal noise power floor taken over all carriers of an antenna branch, as the estimate of the thermal noise power floor valid for al carriers of said antenna branch/analogue signal path.

Figure 6:
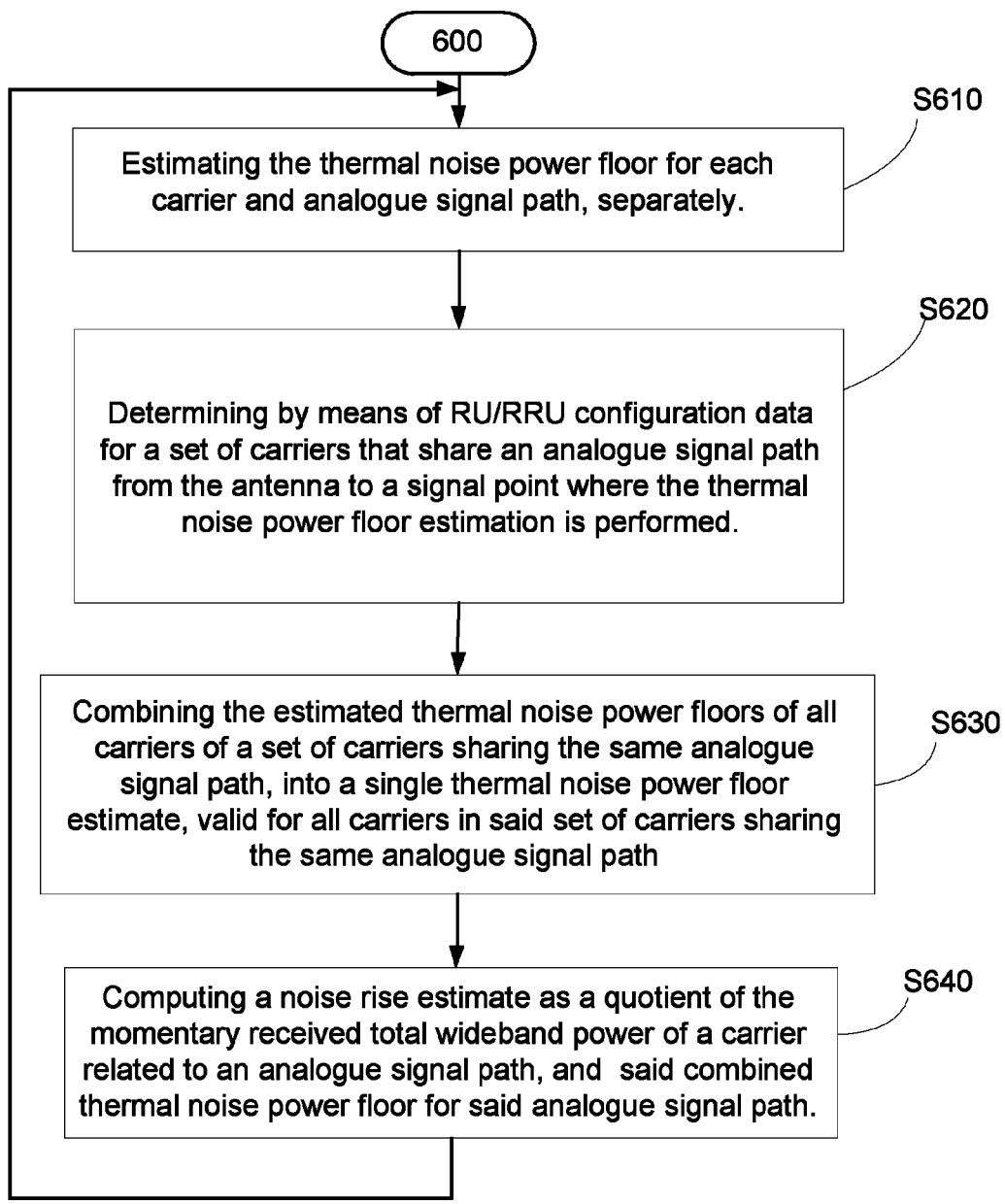
FIG. 6 is a flowchart illustrating a method according to the invention.

FIG. 6 is a flowchart illustrating a method for enhanced determining noise rise estimate according to the invention.

Method 600 for determining a noise rise estimate in a radio access node of a Radio Network System supporting Multi-Carrier High-Speed Packet Access transmission of user radio traffic between the radio access node and one or more User Equipments. At least one radio access node comprises a radio front end comprising a Radio Unit, RU, and/or Remote Radio Unit, RRU, connected to one or more antenna branches constituting one or more analogue signal paths for received carriers, said method comprising:

S610:—Estimating the thermal noise power floor for each carrier and analogue signal path, separately. Prior art RBS architectures have been focused on obtaining thermal noise power floor estimates, for each of the UL antenna branches. The two algorithms that have been devised for thermal noise power floor estimation is described further down in this specification. These estimators are applied in baseband after the carriers are separated in the RU/RRU. This is because the estimators operate on power estimates, obtained from each carrier IQ chip stream after A/D conversion. Hence, power samples for carrier k on analogue signal path m are obtained as $$P_{k,m,RTWP} = \frac{1}{N}\sum_{n=1}^{N}(I_{k,m,n}^2 + Q_{k,m,n}^2), \; k=1,\ldots,K, m=1,\ldots,M.$$

Here n denotes the time index and N is the power sampling time in chips. N typically corresponds to one EUL transmission time interval, i.e. 2 ms or 10 ms. The quantity $P_{k,m,RTWP}$ is usually denoted the total received wideband power RTWP. Using the prior art algorithms described with reference to FIG. 8, the following estimates of the thermal noise power floors are then obtained for, $$P_{k,m,N_0}, k=1,\ldots,K, m=1,\ldots,M.$$

S620:—Determining by means of RU/RRU configuration data for set of carriers that share an analogue signal path from the antenna to a signal point where the thermal noise power floor estimation is performed. Preferably, said signal point, or reference point (30 in FIG. 2), is situated in the signal chain after the bandpass filtering and A/D conversion has produced chip streams for said sets of carriers. The analogue signal path is determined for all carriers, and all antennas using e.g. an adapted analysis software e.g. cable walk. Given the results the carriers are collected in sets where each set corresponds to a specific analogue signal path. One such set is denoted $$\{k,a|\text{signalpath}=m\} = \{\{k_1,a\}, \ldots, \{k_{max},a\}\} = \{k_1,\ldots,k_{max},m\},$$

where a corresponds to a specific antenna head upon which uplink power is impinging. Note that different cross connections and situations with a large number of antenna heads may result in a variety of opportunities. Note also that all carriers impinging on each radio antenna may have different paths, in case each set above contains one element. Referring back to FIG. 4, wherein the RU/RRU provides band pass filtering to separate the carriers C1, C2, C3 and C4, and to provide A/D converted chip streams that are related to each carrier and each antenna branch. The radio configuration in FIG. 4 generates 8 chip streams. The first two chip streams c1a, c2a related to carrier C1 and C2, respectively, are generated in antenna branch ma1 and the next two c3a and c4a in antenna branch ma2. Consequently, chip streams c1a and c2a and set of carriers C1 and C2 do not share the same analogue signal path as chip streams c3a and c4a related to the set of carriers C3 and C4 in antenna branch ma2. In the same way, the chip streams c1b, c2b are generated in antenna branch ma2 and the next two c3b and c4b in antenna branch mb1. Similarly, said chip streams do not share the same analogue signal path. The radio configuration is therefore of great interest when determining the thermal noise floor power estimates. To determine if the UL paths are the same the analysis software, e.g. cable walk", shall check the radio configuration. If the carriers are using the same antenna branch and same RU/RRU for band pass filtering and A/D conversion the analogue paths are the same, if it's not the same RU for band pass filtering and A/D conversion the analogue paths are not the same. In an analogue cross connect configuration with more then 2 carriers there can be carriers with the same analogue path that can be used for combined estimations.

S630:—Combining the estimated thermal noise power floors of all carriers of a set of carriers sharing the same analogue signal path, into a combined thermal noise power floor estimate $\text{Nmin}_m$, valid for all carriers in said set of carriers sharing the same analogue signal path. The key part of the invention follows from the observation that the value of the thermal noise power floor is uniquely associated with the specific analogue signal path. This is so since the variations of the thermal noise power floor from the theoretical value depends on front end electronic component variations, cabling loss variations and loss due to e.g. poorly connected wave guide devices. Therefore, if a set of different carriers pass through the same signal path they will be related with the same thermal noise power floor. Consequently, since the noise power floor is obscured by interference to a varying degree for different carriers, and since the thermal noise power floor represents the minimal level of interference for any such carrier (the signal power can never become lower than the thermal noise power floor, this is a well-known result of statistical physics), it follows that the following combining rule is preferred $$\hat{P}_{m,N_0}(t) = \min_{k_1,\ldots,k_{max}} (P_{k_1,m,N_0}(t), \cdots, P_{k_{max},m,N_0}(t)).$$

Here $\hat{P}_{m,N_0}(t) = \text{Nmin}_m$ is the combined thermal noise power floor estimate for signal path m, at time t, where the time is counted as the transmission time interval of the EUL. $k_{max}$ is the highest index of the signal carriers that share the signal path m. Thus, the thermal noise power floor estimates is combined by computing the minimum of the estimated thermal noise power floor over all carriers of an antenna branch.

Finally, in case the signal path m corresponds to a specific and complete antenna branch signal path, then $\hat{P}_{m,N_0}(t)$ is the combined thermal noise power floor estimate for that antenna branch (no cross connects).

S640:—Computing a noise rise estimate as a quotient of the momentary received total wideband power of a carrier related to an analogue signal path, and said combined thermal noise power floor for said analogue signal path.

In some embodiments of the method, the noise rise estimate is a rise over thermal estimate, i.e. ROT estimate, for a carrier k.

Different alternative ways of the computation are used depending on which kind of receiver is used in the baseband block (see 40 in FIG. 2). If a rake receiver is used in the base band of the radio access node the noise rise estimate for carrier k with signal path m is computed according to the following equation:

$$RoT_{k,m}(t) = \frac{P_{k,m,RTWP}(t)}{\hat{P}_{m,N_0}(t)}$$

If instead a G-rake+ receiver is used in the base band of the radio access node and the rise over thermal is computed according to the following equation:

$$RoT_{u,k,m}^G(t) = \frac{\left(1 + \frac{SF_{u,k,m,DPCCH}(\overline{m})}{\beta_{u,k,m,\text{effective}}^2(\overline{m})} \frac{1}{SINR_{u,k,m}^G(\overline{m})}\right) \sum_{m=1}^{M} |\hat{w}_{u,k,m}^H(\overline{m})\hat{h}_{u,k,m}(\overline{m})|^2 \hat{E}_{S,u,k,m}(\overline{m})}{\hat{P}_{m,N_0}(t) \sum_{m=1}^{M} \hat{w}_{u,k,m}^H(\overline{m})\hat{w}_{u,k,m}(\overline{m})}$$

$u = 1, \ldots, U$, $U$ is the number of users in the UL;

$$RoT_{k,m}^{G+} = \max_u RoT_{u,k,m}^{G+},$$

Here $RoT_{u,k,m}^G$ is the load seen by user u, $\hat{E}_{S,u,k,m}^G$ is the power of user u measured after the G-rake+, $SF_{u,k,m,EDPCCH}$ is the spreading factor (EDPCCH is the enhanced Dedicated Physical Control Channel), $\beta_{u,k,m,\text{effective}}$ is the total power factor, and $SINR_u^G$ is the signal to interference ration measured after G-rake+, i.e. the quantity that closes the inner power control loop. As can be seen, the cell load is selected as the maximum rise over thermal, as seen by any user of the cell. $\hat{h}_{u,k,m}$, $u=1, \ldots, U$, is the net channel response of user u for carrier k and path m and where $\hat{w}_{u,k,m}$ are the combining weights.

According to other embodiments, the noise rise estimate is a rise over thermal estimate relevant for stability, wherein the received total wideband power is compensated with an estimate of neighbour cell interference for carrier k, defined as $$\frac{\hat{P}_{neighbor,k,m}(t)}{\hat{P}_{m,N_0}(t)}$$

There are known methods for measuring of neighbour cell interference $$\hat{P}_{Neighbor,k,m}(t)$$

Different alternative ways of the computation are used depending on which kind of receiver is used in the baseband block (see 40 in FIG. 2). If a rake receiver is used in the base band of the radio access node, and the rise over thermal relevant for stability is computed according to the following equation:

$$NR_{k,m}(t) = \frac{P_{k,m,RTWP}(t) - \hat{P}_{k,m,neighbor}(t)}{\hat{P}_{m,N_0}(t)}$$

Alternatively, if a G-rake+ receiver is used in the base band of the radio access node, and the rise over thermal relevant for stability is computed according to the following equation:

$$NR^G_{Stability u,k,m}(t) =$$

$$\frac{\sum_{m=1}^{M}|\hat{w}^H_{u,k,m}(\overline{m})\hat{h}_{u,k,m}(\overline{m})|^2 \hat{E}_{S,u,k,m}(\overline{m})\left(1+\frac{SF_{k,mu,DPCCH}(\overline{m})}{\beta^2_{u,k,m,effective}(\overline{m})}\frac{1}{SINR^G_{u,k,m}(\overline{m})}\right)}{\hat{P}_{m,N_0}(t)\sum_{m=1}^{M}\hat{w}^H_{u,k,m}(m)\hat{w}_{u,k,m}(m)} - \frac{\hat{P}_{Neighbor,k,m}(t)}{\hat{P}_{m,N_0}(t)},$$

$u = 1, \ldots, U$, $U$ is the number of users in the UL;

$$NR^G_{Stability,k,m}(t) = \max_{u} NR^G_{stability,u,k,m}(t)$$

$RoT_{u,k,m}{}^G$ is the load seen by user u, $\hat{E}_{S,u,k,m}{}^G$ is the power of user u measured after the G-rake+, $SF_{u,k,m,EDPCCH}$ is the spreading factor (EDPCCH is the enhanced Dedicated Physical Control Channel), $\beta_{u,k,m,effective}$ is the total power factor, and $SINR_u{}^G$ is the signal to interference ration measured after G-rake+, i.e. the quantity that closes the inner power control loop. As can be seen, the cell load is selected as the maximum rise over thermal, as seen by any user of the cell. $\hat{h}_{u,k,m}$, u=1, . . . ,U, is the net channel response of user u for carrier k and path m and where $\hat{w}_{u,k,m}$ are the combining weights.

The steps S610-S640 of the method may be repeated when at least one of the thermal noise power floors of said carriers and analogue signal paths are updated. Alternatively, the steps of the method are repeated at each transmission time interval of an enhanced uplink.

In one embodiment, the method 600 according to the invention comprises step S635, preferably performed between steps S630 and S640 of the method:

S635:—Checking if said signal path can be referred to an antenna branch, and if so, associating said combined thermal noise power floor estimate with said antenna branch. This step connects combined thermal noise power floor estimates for signal paths and the corresponding antenna branches. A list or table may be created, wherein said information is stored in entries or records of the table/list. Said entries may be used for simplifying the estimations of noise rise for a new carrier in a set of carriers.

The above described method and embodiments of the method may be implemented according to another aspect of the invention.

Figure 7:
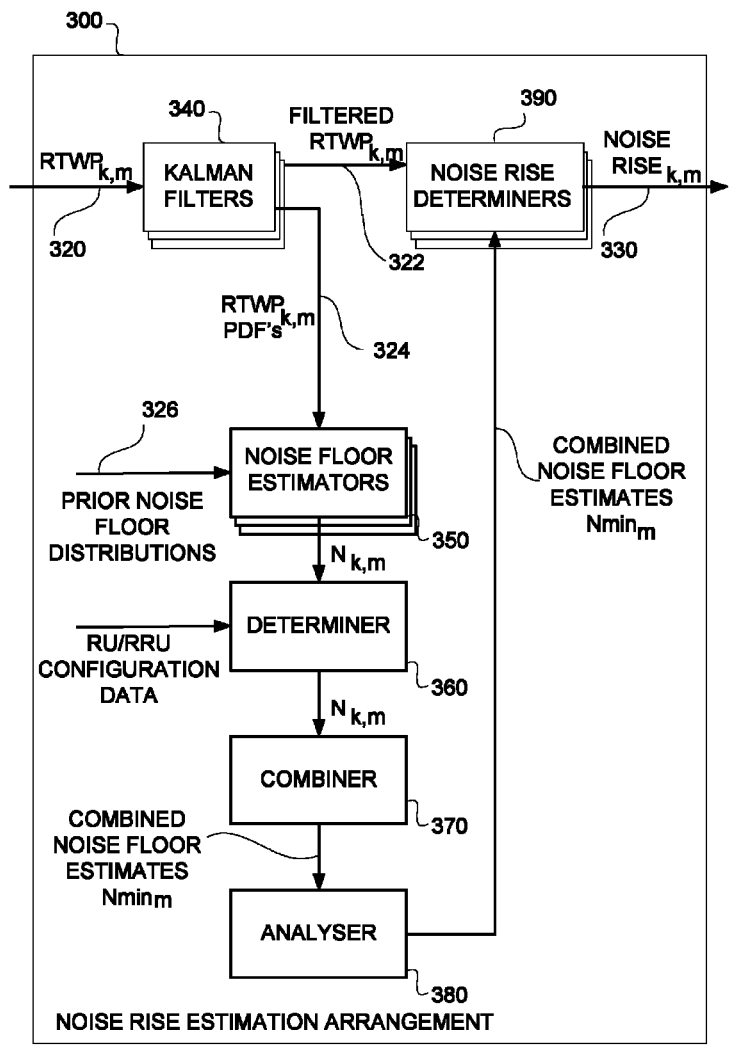
FIG. 7 is a block diagram illustrating an arrangement for enhanced determining noise rise estimate according to the invention.

FIG. 7 is a block diagram illustrating an arrangement for determining noise rise estimate.

As already stated above, the invention aims at enhancing the robustness of the present noise power floor estimation, by disclosing of new combining means using the multi-carrier configuration in the radio front end of an RBS. Irrespective of any analogue combining, the total uplink interference of each (frequency shifted) carrier that enters a specific antenna branch of a diversity antenna arrangement follows the same analogue signal path in to the digital baseband receiver. The thermal noise power floor is dependent on and characterized only by the front end electronics and cabling in the analogue signal path related to each antenna branch. The invention discloses the use of one thermal noise estimator per carrier on each antenna branch, i.e. analogue signal path. Since the result of the thermal noise power floor should be the same for all carriers on the same antenna branch/analogue signal path, the invention also teaches the use of the minimum of the estimated thermal noise power floor taken over all carriers of an antenna branch, as the estimate of the thermal noise power floor valid for al carriers of said antenna branch/analogue signal path. For reasons explained below, the thermal noise floor needs on line estimation/calibration. Furthermore, also as explained below, the estimator needs to operate on the received wideband power and search for a minimum value over time, this minimum value becoming the estimated thermal noise floor.

An embodiment of estimating noise rise is schematically illustrated as a block diagram in FIG. 7. This embodiment relates to the field of load estimation in code division multiple access cellular telephone systems. The disclosure of the preferred embodiment is written for load estimation functionality with respect to the enhanced uplink (E-UL) in WCDMA type cellular systems. Note however, that the situation for other cellular systems of CDMA type should be similar so most of the detailed discussion should be valid for these systems as well.

Note that in the following description, probability distributions are handled by digital systems, typically by discretising the distributions as histograms.

A noise rise estimation arrangement 300 comprises three main blocks 340, 350, 390. In a first, power estimation block 340, a Kalman filters arrangement receives inputs $RTWP_{k,m}$, in the present embodiment the measured received total wideband power $RTWP_{k,m}$ for a carrier k and path m. A power sensing arrangement (see 51 in FIG. 1) may provide these measurements. Mathematical details of preferred embodiment are disclosed in WO 2007/024166, see e.g. Appendix A. The output 324 from the power estimation block 340 is the estimate of a power quantity and the corresponding variance $RTWP_{k,m}$ PDFs, in the present embodiment the estimate of the received total wideband power $RTWP_{k,m}$ for a carrier k and path m, and the corresponding variance. Since the outputs are from the Kalman filters arrangement, these parameter are the only ones needed to define the estimated Gaussian distribution that is produced by the filter. Thus, enough information is given to define the entire probability distribution information of the $RTWP_{k,m}$ estimates. In more advanced systems, the power estimation block 340 may base its estimated on further power parameters, e.g. measured code power to interference ratio (C/I) of different channels.

In a second, conditional probability distribution, PDF, estimation block 350, an arrangement based on Bayesian statistics receives the power quantity estimate and the corresponding standard deviation $RTWP_{k,m}$ PDF as inputs, and provides an output $N_{k,m}$ comprising parameters associated with a noise floor power for carrier k and path m. This may be a single value of a noise floor power or parameters of an estimated probability distribution of a noise floor power. Prior known parameters representing histograms of probability density functions of noise floor is stored in a storage providing information about a prior expected probability distribution of the noise floor power to the conditional probability distribution estimation block 350, in order to achieve an optimal estimation.

The effect on the subsequent noise power floor estimation processing block is beneficial, but intricate to understand. A highly technical explanation follows for the interested reader.

Note that when the long term average load of the system increases, then normally the neighbour cell interference increases. The consequence is that the likelihood of low values of the estimated total power is reduced with increasing neighbour cell interference. The soft noise power floor estimation algorithm operates by removing portions of the prior probability distribution of the thermal noise power floor, from above, by application of a calculation of the probability distribution of the minimum of the estimated total power. This moves the centre of gravity of the prior distribution towards lower values, thereby reducing the optimal estimate of the thermal noise power floor. The amount that is cut away is determined by the probability distributions of the estimated total power that fall within a pre-determined, sparsely sampled sliding window. Then a total power probability distribution with a larger variance will obviously cut away a larger portion of the prior probability distribution than one with the same mean value and a smaller variance. The reason is that the probability distribution function with the larger variance extends further into the region of nonzero support of the prior probability distribution.

A possible straight-forward approach for estimating the minimum is to compute the estimate over a pre-determined interval of time, a so-called sliding window. The detailed mathematical description of the estimation of the conditional probability distribution based on such a sliding window is known from WO 2007/024166, see e.g. Appendix B.

In a third, noise rise estimation block 390, the combined noise floor estimates $\text{Nmin}_m$ (a combined estimated probability distribution of the noise floor for a set of carriers and analogue signal path m) and $\text{RTWP}_{k,m}$ estimate are received as inputs, and provides primarily an output 330 comprising a noise rise value.

The blocks 340, 350 and 390 are preferably integrated into one processor. However, any arrangements comprising, but not limited to, different distributed solutions are also possible to use, where the processor means comprising the blocks 340, 350 and 390 may be considered as a distributed processor means.

In particular, the arrangement 300 for noise rise estimation in a wireless communication system is supplied with $\text{RTWP}_{k,m}$ measurements 320 for each carrier k and analogue signal path m. The $\text{RTWP}_{k,m}$ measurements 320 are used in a set of Kalman filters 312, one for each carrier k and signal path to produce filtered estimates 322 of the $\text{RTWP}_{k,m}$ as well as Probability Density Functions, PDFs, 324 of the $\text{RTWP}_{k,m}$. These probability density functions 334 are provided to a set of noise floor estimators 350, in which noise floor estimates $N_{k,m}$ are provided with knowledge of prior noise floor distributions 326. The noise floor estimators 350 operate preferably with a sliding window algorithm, which is described with reference to FIG. 8 and WO 2007/024166, see e.g. Appendix B. Further, the estimators 350 is configured to estimate the thermal noise power floor $N_{k,m}$ for each carrier k and antenna branch m, separately. This corresponds to step S610 in the method according to the invention. The thermal noise power floor $N_{k,m}$ for each carrier k and antenna branch m is provided to a determiner 360 configured to determine by means of RU/RRU configuration data which sets of carriers sharing an analogue signal path from the antenna to a signal point where the thermal noise power floor estimation is performed. This corresponds to step S620 in the method according to the invention. Said signal point may be where the bandpass filtering and A/D conversion has produced a chip stream for said sets of carriers. The resulting information about which sets of carriers sharing an analogue signal path is fed to a combiner 370. The combiner 370 is configured to combine the estimated thermal noise power floors of all carriers of a set of carriers sharing the same analogue signal path, into a single thermal noise power floor estimate $N_{k,m}$, valid for all carriers in said set of carriers sharing the same analogue signal path. This corresponds to step S630 in the method according to the invention.

According to one embodiment of the arrangement, the combiner 370 is configured to combine the thermal noise power floor estimates $N_{k,m}$ by computing the minimum of the estimated thermal noise power floor over all carriers of an antenna branch.

Optionally, an antenna branch and signal path analyser 380 may be provided and configured to check if a signal path can be referred to a specific antenna branch of the available antenna branches, and if so, associating said combined thermal noise power floor estimate $\text{Nmin}_m$ with said antenna branch and/or signal path.

A noise rise determiner 390 is provided and configured to compute noise rise estimate RoT or NR as a quotient of the momentary received total wideband power of a carrier related to an analogue signal path, and said combined thermal noise power floor for said analogue signal path. This corresponds to step S640 in the method according to the invention.

According to some embodiments, the noise rise estimate is a rise over thermal estimate, i.e. ROT estimate, for a carrier k and antenna branch m. If the wherein a rake receiver is used in the base band of the radio access node the noise rise estimate for carrier k with signal path m is computed according to the following equation:

$$RoT_{k,m}(t) = \frac{P_{k,m,RTWP}(t)}{\hat{P}_{m,N_0}(t)}$$

According to some embodiments, if a G-rake+ receiver is used in the base band of the radio access node and the rise over thermal is computed according to the following equation:

$$RoT_{u,k,m}^G(t) = \frac{\sum_{\overline{m}=1}^{M} \left|\hat{w}_{u,k,m}^H(\overline{m})\hat{h}_{u,k,m}(\overline{m})\right|^2 \hat{E}_{S,u,k,m}(\overline{m}) \left(1 + \frac{SF_{u,k,m,DPCCH}(\overline{m})}{\beta_{u,k,m,\text{effective}}^2(\overline{m})} \frac{1}{SINR_{u,k,m}^G(\overline{m})}\right)}{\hat{P}_{m,N_0}(t) \sum_{m=1}^{M} \hat{w}_{u,k,m}^H(\overline{m})\hat{w}_{u,k,m}(\overline{m})}$$

$u = 1, \ldots, U$, $U$ is the number of users in the $UL$;

$RoTu_{u,k,m}^G = \max_u RoT_{u,k,m}^G$

Here $RoT_{u,k,m}^G$ is the load seen by user u, $\hat{E}_{S,u,k,m}^G$ is the power of user u measured after the G-rake+, $SF_{u,k,m,EDPCCH}$ is the spreading factor, $\beta_{u,k,m,\text{effective}}$ is the total power factor, and $SINR_u^G$ is the signal to interference ration measured after G-rake+, i.e. the quantity that closes the inner power control loop. As can be seen, the cell load is selected as the maximum rise over thermal, as seen by any user of the cell. This is the limiting user of the cell.

According to some other embodiments, the noise rise estimate is a rise over thermal estimate relevant for stability, wherein the received total wideband power is compensated with an estimate of neighbour cell interference for carrier k and signal path m, defined as According to other embodiments, the noise rise estimate is a rise over thermal estimate relevant for stability, wherein the received total wideband power is compensated with an estimate of neighbour cell interference for carrier k, defined as $$\frac{\hat{P}_{Neighbor,k,m}(t)}{\hat{P}_{m,N_0}(t)}$$

There are known methods for measuring of neighbour cell interference $$\hat{P}_{Neighbor,k,m}(t)$$

If a rake receiver is used in the base band of the radio access node, and the rise over thermal relevant for stability is computed according to the following equation:

$$NR_{k,m}(t) = \frac{P_{k,m,RTWP}(t) - \hat{P}_{k,m,neighbor}(t)}{\hat{P}_{m,N_0}(t)}$$

If instead a G– rake+ receiver is used in the base band of the radio access node, the rise over thermal relevant for stability is computed according to the following equation:

$$NR^G_{Stability\,u,k,m}(t) =$$

$$\frac{\sum_{m=1}^{M}\left|\hat{w}^H_{u,k,m}(\overline{m})\hat{h}_{u,k,m}(\overline{m})\right|^2 \hat{E}_{S,u,k,m}(\overline{m}) \left(1+\frac{SF_{k,mu,DPCCH}(\overline{m})}{\beta^2_{u,k,m,effective}(\overline{m})}\frac{1}{SINR^G_{u,k,m}(\overline{m})}\right)}{\hat{P}_{m,N_0}(t)\sum_{m=1}^{M}\hat{w}^H_{u,k,m}(m)\hat{w}_{u,k,m}(m)} - \frac{\hat{P}_{Neighbor,k,m}(t)}{\hat{P}_{m,N_0}(t)},$$

$u = 1, \ldots, U$, $U$ is the number of users in the $UL$;

$$NR^G_{Stability,k,m}(t) = \max_{u} NR^G_{stability,u,k,m}(t).$$

Here $RoT_{u,k,m}{}^G$ is the load seen by user u, $\hat{E}_{S,u,k,m}{}^G$ is the power of user u measured after the G-rake+, $SF_{u,k,m,EDPCCH}$ is the spreading factor (EDPCCH is the enhanced Dedicated Physical Control Channel), $\beta_{u,k,m,effective}$ is the total power factor, and $SINR_u{}^G$ is the signal to interference ration measured after G-rake+, i.e. the quantity that closes the inner power control loop. As can be seen, the cell load is selected as the maximum rise over thermal, as seen by any user of the cell. $\hat{h}_{u,k,m}$, u=1, . . . ,U, is the net channel response of user u for carrier k and path m and where $\hat{w}_{u,k,m}$ are the combining weights.

The noise floor estimates $Nmin_m$ and the filtered estimates 322 of the $RTWP_{k,m}$ are provided to a noise rise determiner 316, producing an output of a noise rise measure, in this embodiment a RoT value for each carrier k and signal path m.

It is important to understand that this estimation relies on the fact that the noise floor is constant over very long periods of time (disregarding the small temperature drift).

The different aspects of the invention may be implemented in digital electronically circuitry, or in computer hardware, firmware, software, or in combinations of them. The different embodiments of the method and arrangement of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The aspects of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

The advantage of the approach is that carriers normally experience very different load levels, hence it will be more easy to estimate an accurate thermal noise power floor for a moderately loaded carrier, than for a highly loaded carrier. This results in:

Enhanced robustness against high 24/7 WCDMA UL load levels;

Improved accuracy of the estimated thermal noise power and the estimated rise over thermal power;

Improved performance of the WCDMA UL.

Hereafter, a summary of methods and arrangement for determining thermal noise floor, noise floor and other power quantities are presented.

As already described, prior art has been described in a number of documents, see e.g. WO 2008/039123 A1, WO 2011/031193 A1 and WO 2007/024166.

Load estimation in the WCDMA uplink is performed for many reasons in prior art. Most importantly, the present scheduling of enhanced uplink traffic is based on the principle to schedule users until a load threshold is reached. Such scheduling decisions are taken every 2/10 ms transmission time interval (TTI). Thresholds are typically used in order to maintain a planned coverage, and to maintain cell stability avoiding inner loop power control (ILPC) power rushes. When coverage is addressed neighbour cell interference is incorporated in the load measure, this is not the case when cell stability is treated. The scheduling and load estimation functionality and algorithms are both located in the WCDMA RBS. It is also possible to use the estimated uplink load in load based admission control algorithms. Also this is known in prior art. These algorithms use the uplink load in order to determine if new users can be admitted in specific cells. The admission control functionality is located in the RNC node. Signalling means for signalling of load is available over the NBAP interface.

Uplink Load Estimation with RAKE Receivers

It is e.g. shown in standard textbooks that without advanced interference suppressing (IS) receivers and interference cancellation (IC), the load defined at the antenna connector is given by the noise rise, or rise over thermal, RoT(t), defined by $$RoT(t) = \frac{RTWP(t)}{N},$$

where N is the thermal noise level as measured at the antenna connector. The definition of RTWP(t) is the total wideband power $$RTWP(t) = \sum_{u=1}^{U} P_u(t) + I(t) + N,$$

also measured at the antenna connector. Here $P_u$ (t), u=1, . . . ,U, denotes the power of uplink user u, and I(t) denotes the power as received from neighbour cells of the WCDMA system.

The load measure is relevant for detection performance is of interest. This load measure is given by various versions of the rise over thermal.

Sliding Window Noise Floor Estimation

Figure 8:
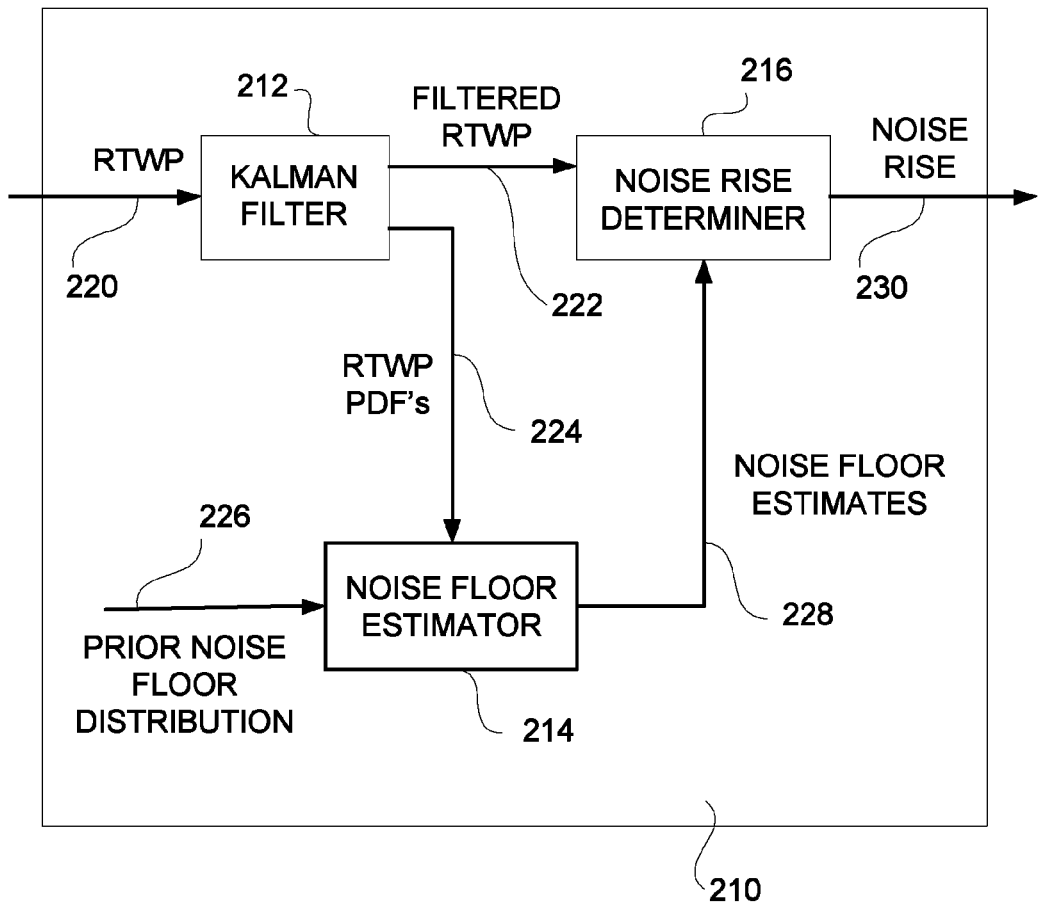
FIG. 8 is a block diagram of an noise rate estimation arrangement according to prior art.

An embodiment of the RoT estimation algorithm is depicted in FIG. 8. It is described in detail in the published international patent application WO 2007/024166. The algorithm estimates the RoT, as given by the quotient between the total wideband power and the thermal noise power floor. The main problem solved by the estimation algorithm is the accurate estimation of the thermal noise floor. Since it is not possible to obtain exact estimates of this quantity due to the neighbor cell interference, the estimator therefore applies an approximation, by consideration of the soft minimum as computed over a relative long window in time.

The known arrangement 210 for noise rise estimation ii a wireless communication system is supplied with RTWP measurements 220. The RTWP measurements 220 are used in a Kalman filter 212 to produce filtered estimates 222 of the RTWP as well as Probability Density Functions, PDFs, 224 of the RTWP. These probability density functions 124 are provided to a noise floor estimator 214, in which noise floor estimates 228 are provided with knowledge of a prior noise floor distribution 226. The noise floor estimator 214 operates preferably with a sliding window algorithm. The noise floor estimates 228 and the filtered estimates 222 of the RTWP are provided to a noise rise determiner 216, producing an output of a noise rise measure, in this embodiment a RoT value.

It is important to understand that this estimation relies on the fact that the noise floor is constant over very long periods of time (disregarding the small temperature drift).

Recursive Noise Floor Estimation

The sliding window algorithm has the disadvantage of requiring a large amount of storage memory. This becomes particularly troublesome in case a large number of instances of the algorithm are needed, as may be the case when interference cancellation is introduced in the uplink.

To reduce the memory consumption a recursive algorithm was disclosed in the international publication WO 2007/024166. That algorithm reduces the memory requirements of the sliding window scheme discussed above at least by a factor of 100.

The invention disclosed here is applicable both to the sliding window RoT estimation algorithm and the recursive algorithm.

Uplink Load Estimation with G-Rake+ and Chip Equalizer Receivers

The difference with G-rake+ as compared to conventional RAKE, is that each user sees a reduced level of interference, immediately after the so called weight combining step. In G-rake+, a covariance matrix $$\hat{R}_u, u=1, \ldots, U$$

with the order equal to the number of fingers is first estimated to capture the interference. The codes not used by the present user u may be used in order to estimate $$\hat{R}_u.$$

The GRAKE+ receiver uses the estimated covariance matrix that models the interference for computation of the combining weights for the users u, u=1, . . . , U $$\hat{R}_u \hat{w}_u = \hat{h}_u, u=1, \ldots, U$$

where $\hat{h}_u$, u=1, . . . ,U, is the net channel response of user u and where $\hat{w}_u$ are the combining weights.

The effect of the above equation is that GRAKE+ essentially whitens the correlated interference and removes large spectral peaks from interferers at certain finger locations and for certain antenna elements.

The international patent publication WO 2011/031193 A1 discusses how an equivalent of the RoT can be computed after G-rake+ IS gains. The end result is given by $$RoT_u^G(t) = \frac{\sum_{m=1}^{M} \left|\hat{w}_u^H(\bar{m})\hat{h}_u(\bar{m})\right|^2 \hat{E}_{S,u}(\bar{m}) \left(1 + \frac{SF_{u,DPCCH}(\bar{m})}{\beta_{u,effective}^2(\bar{m})} \frac{1}{SINR_u^G(\bar{m})}\right)}{\hat{P}_N(t) \sum_{m=1}^{M} \hat{w}_u^H(\bar{m})\hat{w}_u(\bar{m})},$$

$$u = 1, \ldots, U.$$
$$RoT^{G+} = \max_u RoT_u^{G+}.$$

Here $RoT_u^{G+}$ is the load seen by user u, $\hat{E}_{S,u}^{G+}$ is the power of user u measured after the G-rake+, $SF_{u,EDPCCH}$ is the spreading factor, $\beta_{u,effective}$ is the total power factor, and $SINR_u^{G+}$ is the signal to interference ration measured after G-rake+, i.e. the quantity that closes the inner power control loop. As can be seen, the cell load is selected as the maximum rise over thermal, as seen by any user of the cell. This is the limiting user of the cell.

There is also a noise rise measure for cell stability. It is obtained by subtraction of the neighbour cell interference estimate as $$NR_{Stability u}^G(t) = \frac{\sum_{m=1}^{M} \left|\hat{w}_u^H(\bar{m})\hat{h}_u(\bar{m})\right|^2 \hat{E}_{S,u}(\bar{m}) \left(1 + \frac{SF_{u,DPCCH}(\bar{m})}{\beta_{u,effective}^2(\bar{m})} \frac{1}{SINR_u^G(\bar{m})}\right)}{\hat{P}_N(t) \sum_{m=1}^{M} \hat{w}_u^H(m)\hat{w}_u(m)} - \frac{\hat{P}_{Neighbor}(t)}{\hat{P}_N(t)},$$

-continued $u = 1, \ldots, U$ $NR^G_{Stability}(t) = \max_u NR^G_{stability,u}(t)$ This was a summary of methods and arrangement for determining thermal noise floor, noise floor and other power quantities are presented. Some of the mathematical equations discussed herein are described in more detail in, e.g. WO 2008/039123 A1, WO 2011/031193 A1 and WO 2007/024166.

A number of embodiments of the present invention have been described. It will be understood that various modifications may be made without departing from the scope of the invention. Therefore, other implementations are within the scope of the following claims defining the invention.

The invention claimed is:

1. Method for determining a noise rise estimate in a radio access node of a Radio Network System supporting Multi-Carrier High-Speed Packet Access transmission of user radio traffic between the radio access node and one or more User Equipments, wherein at least one radio access node comprises a radio front end comprising a Radio Unit, RU, and/or Remote Radio Unit, RRU, which comprises one or more antenna branches constituting one or more analogue signal paths for received carriers, said method comprising:

Estimating thermal noise power floor for each carrier and antenna branch, separately;

Determining by means of RU/RRU configuration data for a set of carriers that share an analogue signal path from the antenna to a signal point where the thermal noise power floor estimation is performed;

Combining the estimated thermal noise power floors of all carriers of a set of carriers sharing the same analogue signal path, into a combined thermal noise power floor estimate, valid for all carriers in said set of carriers sharing the same analogue signal path;

Computing the noise rise estimate as a quotient of the momentary received total wideband power of a carrier related to an analogue signal path, and said combined thermal noise power floor for said analogue signal path.

2. The method according to claim 1, wherein the combining step involves:

Combining the thermal noise power floor estimates by computing the minimum of the estimated thermal noise power floor over all carriers of an antenna branch.

3. The method according to claim 1, comprising

Checking if said analogue signal path can be referred to a specific antenna branch, and if so, associating said combined thermal noise power floor estimate with said antenna branch.

4. The method according to claim 1, wherein the steps of the method are repeated when at least one of the thermal noise power floors of said carriers and analogue signal paths are updated.

5. The method according to claim 1, wherein the steps of the method are repeated at each transmission time interval of an enhanced uplink.

6. The method according to claim 1, wherein the noise rise estimate is a rise over thermal estimate for a carrier.

7. The method according to claim 1, wherein the noise rise estimate is a rise over thermal estimate relevant for stability, wherein the received total wideband power is compensated with an estimate of neighbour cell interference for a carrier.

8. The method according to claim 1, wherein the signal point where the thermal noise power floor estimation is performed is the point where bandpass filtering and A/D conversion has produced a chip stream for said sets of carriers.

9. The method according to claim 1, wherein the Radio Access Node is a Base Station.

10. An arrangement for determining of a noise rise estimate in a radio access node of a Radio Network System supporting Multi-Carrier High-Speed Packet Access transmission of user radio traffic between the radio access node and one or more User Equipments, wherein at least one radio access node comprises a radio front end comprising a Radio Unit, RU, and/or Remote Radio Unit, RRU, which comprises one or more antenna branches constituting one or more analogue signal paths for received carriers, said arrangement comprising:

a processor; and a non-transient memory storing a program code, the program code including instructions which, when executed by the processor, causes said arrangement to:

estimate thermal noise power floor for each carrier and antenna branch, separately;

determine by means of RU/RRU configuration data which sets of carriers sharing an analogue signal path from the antenna to a signal point where the thermal noise power floor estimation is performed;

combine the estimated thermal noise power floors of all carriers of a set of carriers sharing the same analogue signal path, into a combined thermal noise power floor estimate, valid for all carriers in said set of carriers sharing the same analogue signal path; and compute the noise rise estimate as a quotient of the momentary received total wideband power of a carrier related to an analogue signal path, and said combined thermal noise power floor for said analogue signal path.

11. The arrangement according to claim 10, wherein the program code further including instructions which, when executed by the processor, causes said arrangement to combine the thermal noise power floor estimates by computing the minimum of the estimated thermal noise power floor over all carriers of an antenna branch.

12. The arrangement according to claim 10, wherein the program code further including instructions which, when executed by the processor, causes said arrangement to check if said analogue signal path can be referred to a specific antenna branch, and if so, associate said combined thermal noise power floor estimate with said antenna branch.

13. The arrangement according to claim 10, wherein the noise rise estimate is a rise over thermal estimate for a carrier.

14. The arrangement according to claim 10, wherein the noise rise estimate is a rise over thermal estimate relevant for stability, wherein the received total wideband power is compensated with an estimate of neighbour cell interference for a carrier.

15. The arrangement according to claim 10, wherein the signal point where the thermal noise power floor estimation is performed is the point where bandpass filtering and A/D conversion has produced a chip stream for said sets of carriers.

16. The arrangement according to claim 10, the arrangement is provided in a Radio Access Node, which is a Radio Base Station.

* * * * *